(12) United States Patent
Sanderson

(10) Patent No.: US 7,344,197 B2
(45) Date of Patent: Mar. 18, 2008

(54) ROLLABLE SUPPORTING DEVICE

(76) Inventor: Brian Matthew Sanderson, 134 E. Rawling Cir., Draper, UT (US) 84020

( * ) Notice: Subject to any disclaimer, the term of this patent is extended or adjusted under 35 U.S.C. 154(b) by 0 days.

(21) Appl. No.: 10/903,589

(22) Filed: Jul. 30, 2004

(65) Prior Publication Data
US 2006/0022494 A1 Feb. 2, 2006

(51) Int. Cl.
*A47C 7/42* (2006.01)
(52) U.S. Cl. .................... 297/452.63; 5/722
(58) Field of Classification Search .......... 297/452.63; 5/722; 428/54, 53, 60, 61; 52/70, 71; 446/479, 446/482
See application file for complete search history.

(56) References Cited

U.S. PATENT DOCUMENTS

| | | | | |
|---|---|---|---|---|
| 359,790 A | * | 3/1887 | Knott | 297/55 |
| 1,886,308 A | * | 11/1932 | Schultes | 297/285 |
| 2,487,907 A | * | 11/1949 | Turner | 297/452.63 |
| 2,558,722 A | * | 7/1951 | Almoslino | 297/16.1 |
| 3,877,750 A | * | 4/1975 | Scholpp | 297/284.3 |
| 3,912,408 A | * | 10/1975 | Domnick | 404/35 |
| 3,928,691 A | * | 12/1975 | Knudson | 428/53 |
| 4,244,622 A | * | 1/1981 | Simpson | 297/273 |
| 5,118,542 A | * | 6/1992 | McLeod | 428/33 |
| 5,157,804 A | * | 10/1992 | Williams | 15/161 |
| 5,282,692 A | * | 2/1994 | McLeod | 404/35 |
| 6,877,816 B1 | * | 4/2005 | Farmont | 297/452.63 |
| 6,932,287 B2 | * | 8/2005 | Kost et al. | 239/661 |

* cited by examiner

*Primary Examiner*—Sarah B. McPartlin
(74) *Attorney, Agent, or Firm*—Clark & Brody

(57) ABSTRACT

The present invention relates to chairs. In particular, the present invention relates to systems and methods for providing a portable chair. Implementation of the present invention takes place in association with a portable chair that can be rolled up for storage or portability purposes. The rolled implementation of the present invention is compact, and easy to manually transport. The present invention can easily be carried in a backpack or on the user's shoulders. The present invention also fits easily in car trunks or closets. Due to its rolling nature, the present invention is effortless to assemble. The invention does not require a locking mechanism that comprises of parts or components. To assemble, the invention is unrolled in one direction and then arranged into the sitting position by manipulating the invention in the opposite direction. The present portable invention is also comfortable and secure. The user of the present invention is able to sit comfortably in a stationary position.

29 Claims, 11 Drawing Sheets

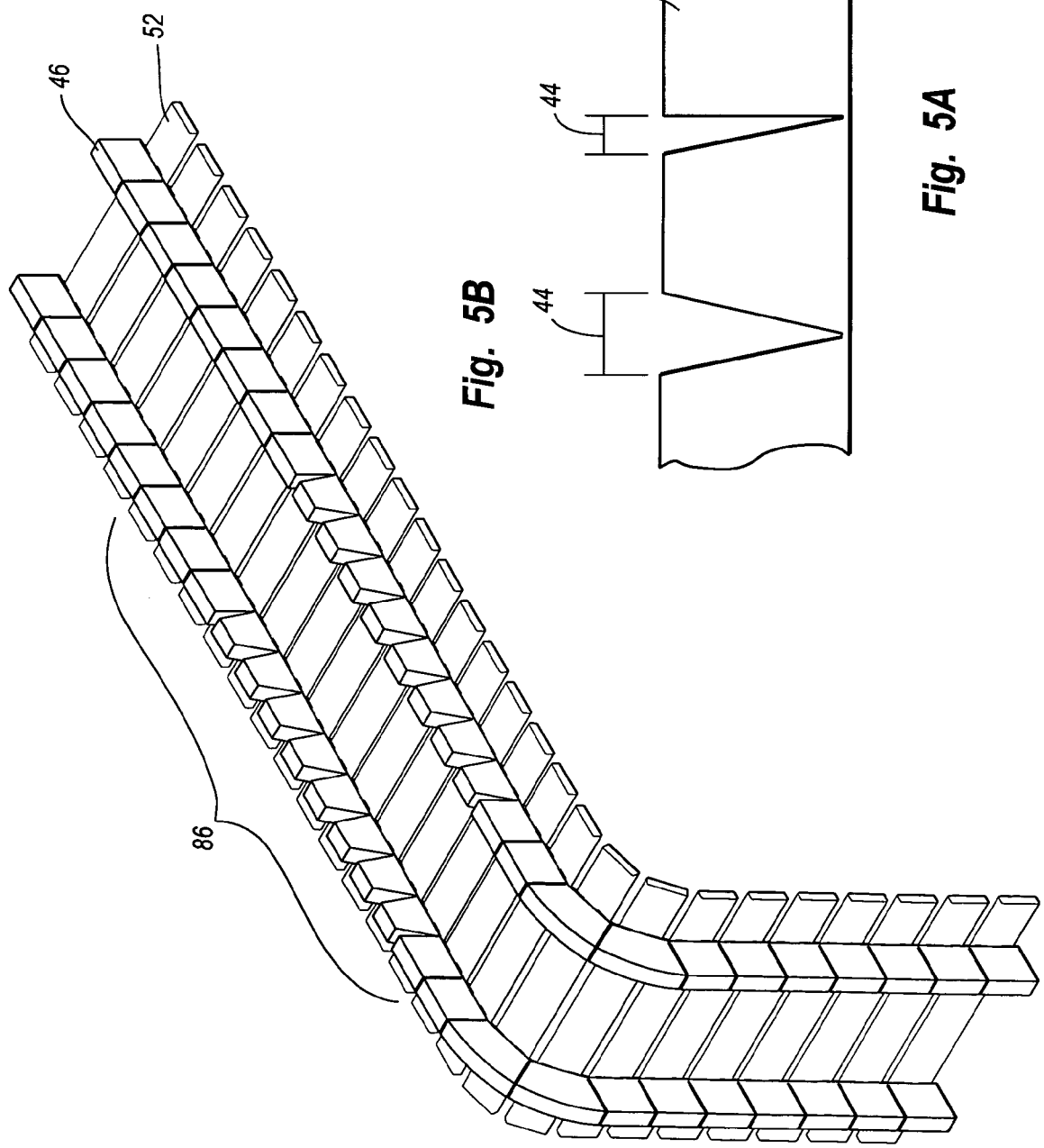

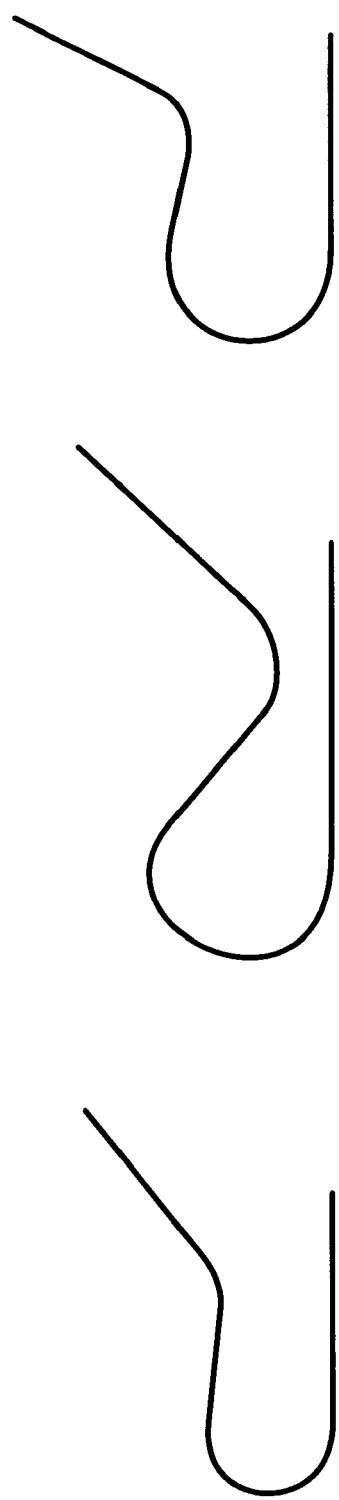
Fig. 6A
Fig. 6B
Fig. 6C
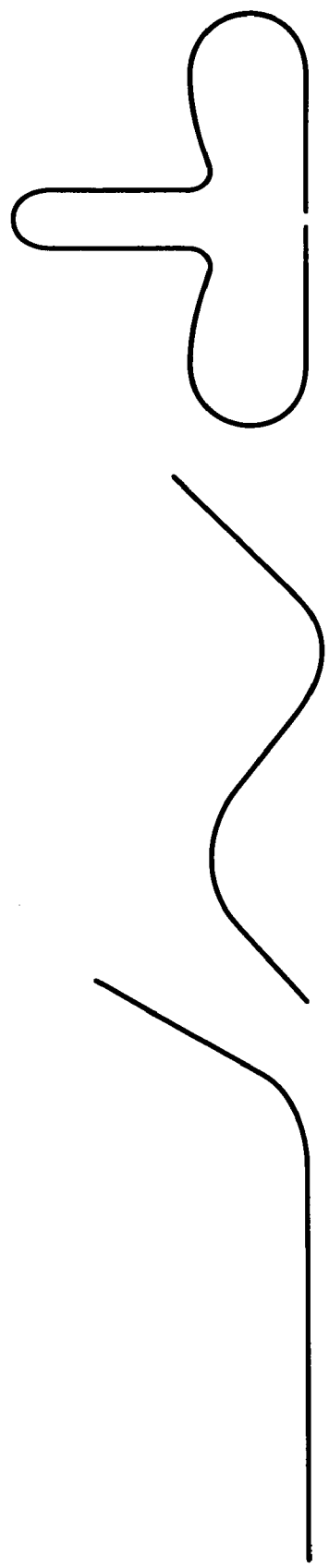
Fig. 6D
Fig. 6E
Fig. 6F

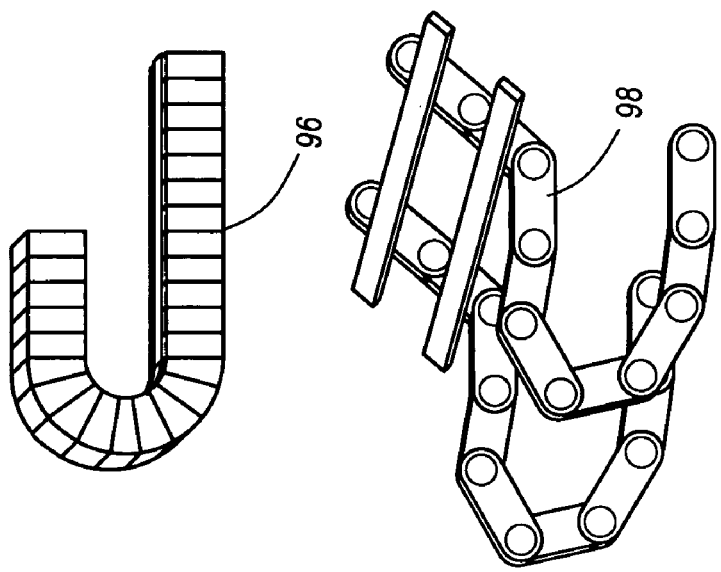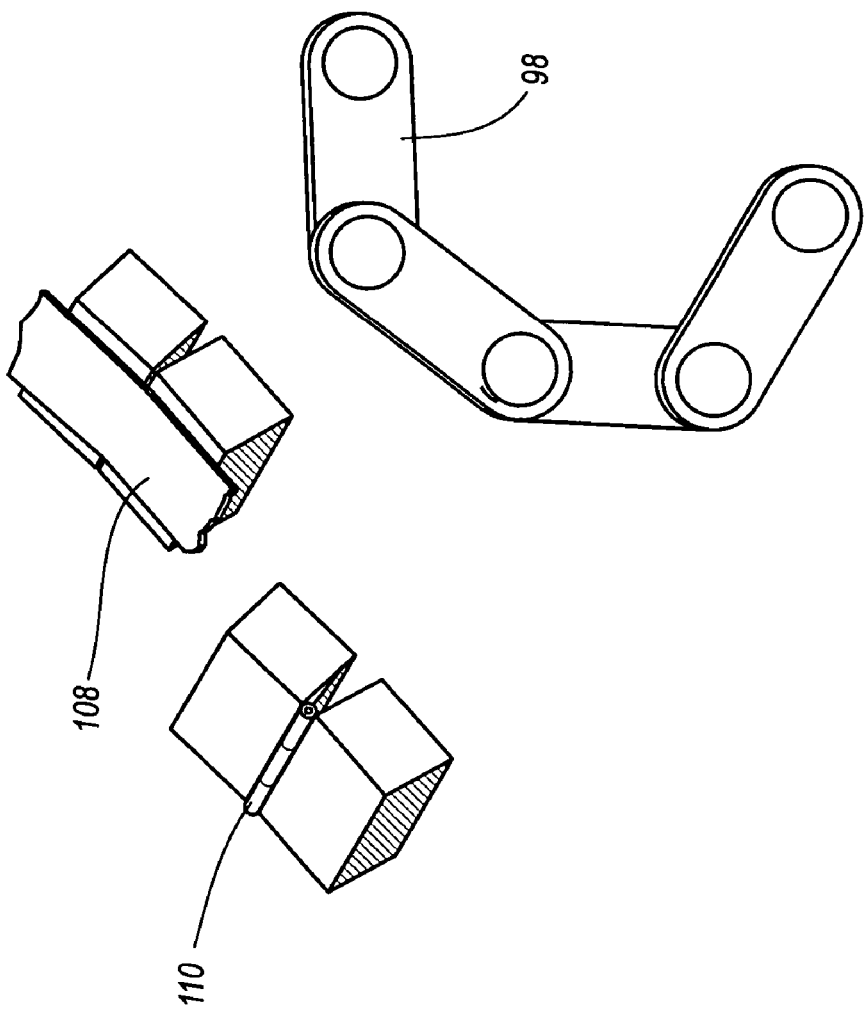
Fig. 9

ROLLABLE SUPPORTING DEVICE

RELATED APPLICATIONS

This application claims priority to U.S. Provisional Patent Application Ser. No. 60/474,646 filed May 31, 2003, entitled TAMBOUR CHAIR, which is incorporated herein by reference.

BACKGROUND OF THE INVENTION

1. Field of the Invention

The present invention relates to portable supporting devices. In particular, the present invention relates to systems and methods for providing a supporting device, wherein at least a portion of the supporting device is dynamically placed into a rolled position.

2. Background and Related Art

Portable chairs can be used in a variety of settings. For example, portable chairs can be used at sporting events, beaches, pools, campsites, concerts, live events, and outdoor theaters. Portable chairs can also be used in residential environments. For example, portable chairs can be used around a table, in a bedroom, in front of a television, or on a deck or patio.

Portable chairs are often foldable or collapsible and comprised of a chair frame and a seat. Such conventional portable chairs have considerable drawbacks. Conventional portable chairs are often uncomfortable or insecure. Some portable chairs utilize frames made of metal bars. The user of the chair can experience discomfort if the metal bars come in contact with the user while sitting or reclining on the chair. To allow a chair to be portable the seat often consists of flimsy and or slippery material. The flimsy and slippery material used to construct the seat causes the chair to feel insecure and wobbly. Because the portable seats are flimsy or wobbly it is impossible for the user to sit comfortably in a stationary position.

Some foldable, portable chairs are bulky. A good foldable chair can be folded into a compact configuration. The ability to compactly fold the chair provides benefits to the user when the user stores or transports the folding chair. Bulky chairs are difficult to store because they often cannot fit in car trunks, under beds, in storage units or in closets. Bulky chairs are inconvenient and awkward to transport, especially long distances. In addition to bulkiness, many portable chairs are awkward to assemble or have multiple parts that are easily lost.

Some styles of portable chairs include various locking mechanisms. The locking mechanisms often utilize pins and locking knobs. The pins and locking knobs can come loose or fall out of place resulting in an ineffective locking mechanism. Sometimes the knobs wear on the frame. Some chairs have multiple locking components which are lost or damaged thus making the portable chair unusable.

Consequently, there is a need in the current market for folding chairs. Specifically, there is a need for portable chairs, which are comfortable, secure, compact, not bulky when folded, easy to assemble, aesthetic and having effective locking mechanisms. Accordingly, the present invention provides a noticeable improvement in the art of portable chairs.

SUMMARY OF THE INVENTION

The present invention relates to portable supporting devices. In particular, the present invention relates to systems and methods for providing a supporting device, wherein at least a portion of the supporting device is dynamically placed into a rolled position.

Implementation of the present invention embraces a rollable supporting device. In one implementation, the rollable supporting device is a piece of furniture (e.g., a chair or other piece of furniture) that can be rolled up. For example, the chair may be rolled up and placed into a position for storage, portability, adjustment, or other use of the chair. In addition to being rolled up the chair may be laid flat or folded into various configurations to support storage, movement, adjustment or additional uses of the chair. For example, the chair can be laid flat to fit under a bed, or folded into a different configuration to form another piece of furniture, such as a table. The rolled supporting device is compact, and facilitates portability. Implementations of the present invention can be carried in a backpack or on the shoulders of a user. Implementations of the present invention can further fit in storage volumes such as car trunks, under beds, in closets, etc.

Due to its rolling nature, transitioning a rollable supporting device from one position to another is effortless. For example, a rollable supporting device is unrolled in one direction and then arranged into the sitting position (e.g., for a chair, bench, etc.) by manipulating the invention in the opposite direction. In at least some implementations, a locking mechanism that comprises parts or components is not required.

Furthermore, a rollable supporting device is comfortable and secure. The user of a rollable supporting device is able to sit comfortably in a stationary position.

While the methods and processes of the present invention have proven to be particularly useful in the area of portable chairs, those skilled in the art can appreciate that the methods and processes can be used in a variety of different applications and in a variety of different areas of manufacture to yield rollable supporting devices. Examples include rollable lounges, benches, beds, surfaces, tables, structures patio furniture, home or apartment furniture, and other dynamic weight sustaining structures.

These and other features and advantages of the present invention will be set forth or will become more fully apparent in the description that follows and in the appended claims. The features and advantages may be realized and obtained by means of the instruments and combinations particularly pointed out in the appended claims. Furthermore, the features and advantages of the invention may be learned by the practice of the invention or will be obvious from the description, as set forth hereinafter.

BRIEF DESCRIPTION OF THE DRAWINGS

A more particular description of the invention is rendered below. Illustrations of various embodiments of the present invention are appended. The drawings depict only typical embodiments of the present invention and are not, therefore, to be considered as limiting the scope of the invention. The present invention will be described and explained with additional specificity and detail through the use of the accompanying drawings in which:

FIGS. 5A-5B illustrate a representative living hinge embodiment;

FIGS. 6A-6F illustrate representative shapes of a rollable supporting device;

FIG. 9 illustrates other embodiments of blocks and/or linking apparatuses, systems, and devices.

DETAILED DESCRIPTION OF THE INVENTION

Figure 1A:
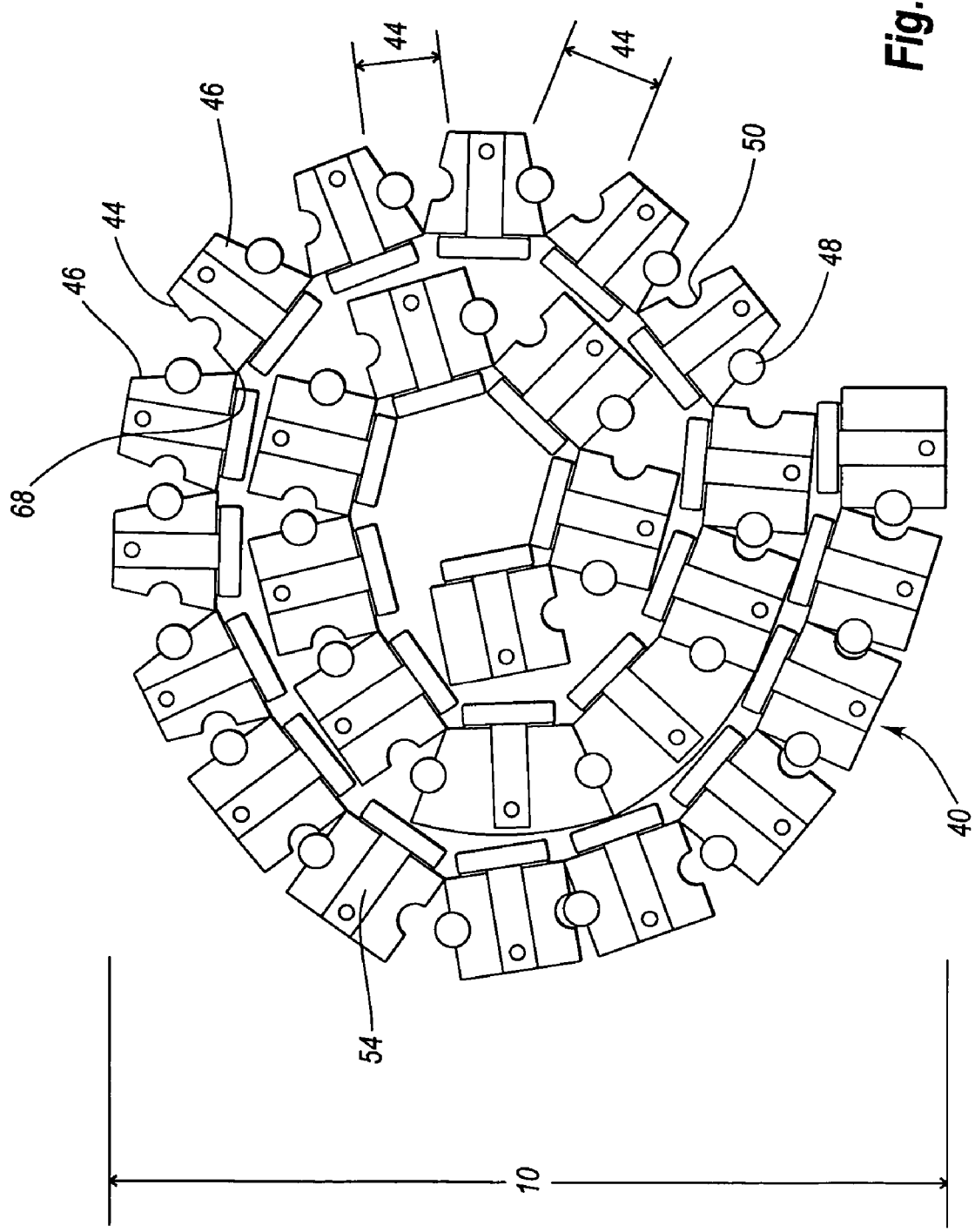
FIGS. 1A-1B illustrate a representative embodiment of the present invention in a rolled and partially rolled position.

The present invention relates to portable supporting devices. In particular, the present invention relates to systems and methods for providing a supporting device, wherein at least a portion of the supporting device is dynamically placed into a rolled position.

It will be readily understood that the components of the present invention, as generally described herein, can be arranged and designed in a wide variety of different configurations. Thus, the following more detailed description of embodiments of the present invention is not intended to limit the scope of the invention, as claimed, but is merely representative of the presently preferred embodiments of the invention. The scope of the invention is, therefore, indicated by the appended claims rather than by the foregoing description. All changes that come within the meaning and range of equivalency of the claims are to be embraced within their scope.

It will be appreciated by those of ordinary skill in the art that the objects of this invention can be achieved without the expense of undue experimentation using well known variants, modifications, or equivalents of the methods and techniques described herein. The skilled artisan will also appreciate that alternative means, other than those specifically described, are available in the art to achieve the functional features of embodiments of the present invention described herein and how to employ those alternatives to achieve functional equivalents of the present invention. It is intended that the present invention include those variants, modifications, alternatives, and equivalents which are appreciated by the skilled artisan and encompassed by the spirit and scope of the present disclosure.

As provided herein, the present invention relates to portable supporting devices. In particular, the present invention relates to systems and methods for providing a supporting device, wherein at least a portion of the supporting device is dynamically placed into rolled position.

In one embodiment of the present invention relates to a portable chair. The presently preferred embodiments of the invention will be best understood, and its benefits and advantages more clearly pointed out, by separating the following more detailed description into sections. The first section of the detailed description is a general discussion of a chair which represents a preferred embodiment of the present invention. The second section of the detailed description is a discussion of other embodiments of the present invention including a table, a partially erect lounge chair and a completely horizontal lounge chair. The third section of the detailed description discusses the various materials and methods employed to produce and manufacture some of the various embodiments of the present invention. Examples of each of the various embodiments are included within each section.

In the disclosure and in the claims the term "supporting device" shall refer to "chairs, folding chairs, portable chairs, benches, park benches, patio furniture, apartment furniture, camping chairs, pool chairs, tables, or any other apparatus to support a human, animal or thing."

In the disclosure and in the claims the term "blocks" shall refer to "a compact solid or hollow piece of natural or manufactured material worked or altered into a particular shape to serve a particular purpose."

In the disclosure and in the claims the term "key" shall refer to "any of various devices having the form or function of fitting neatly within a key way."

In the disclosure and in the claims the term "keyway" shall refer to "a groove or channel for a key."

In the disclosure and in the claims the term "strap" shall refer to "a narrow usually flat strip made from any natural, synthetic or manufactured material."

In the disclosure and in the claims the term "slat" shall refer to "a thin narrow flat strip made from any natural, synthetic or manufactured material."

Section One: The Chair

Figure 2:
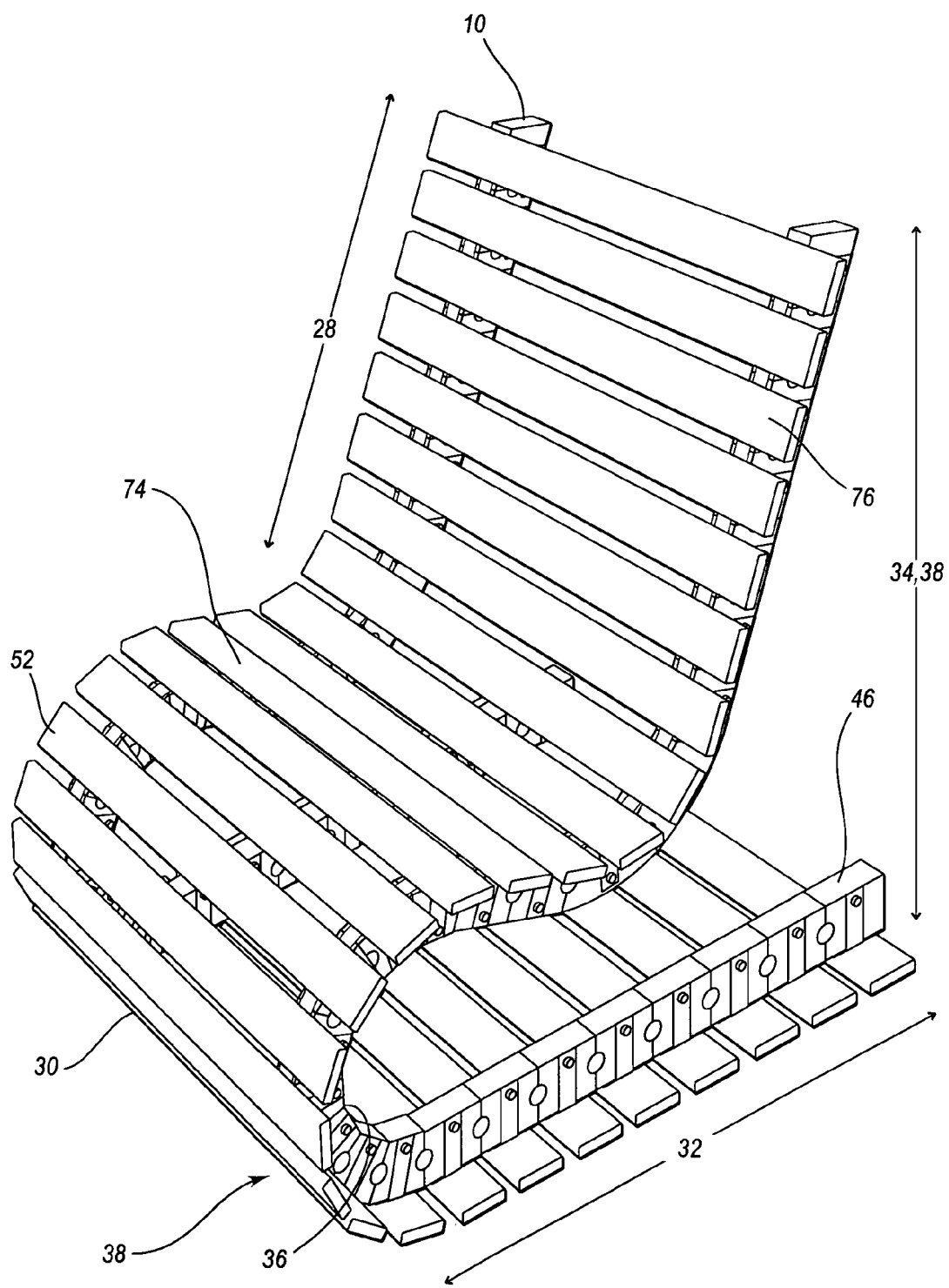
FIG. 2 illustrates a representative embodiment of the present invention in an extended, unrolled, sitting position.
Figure 3:
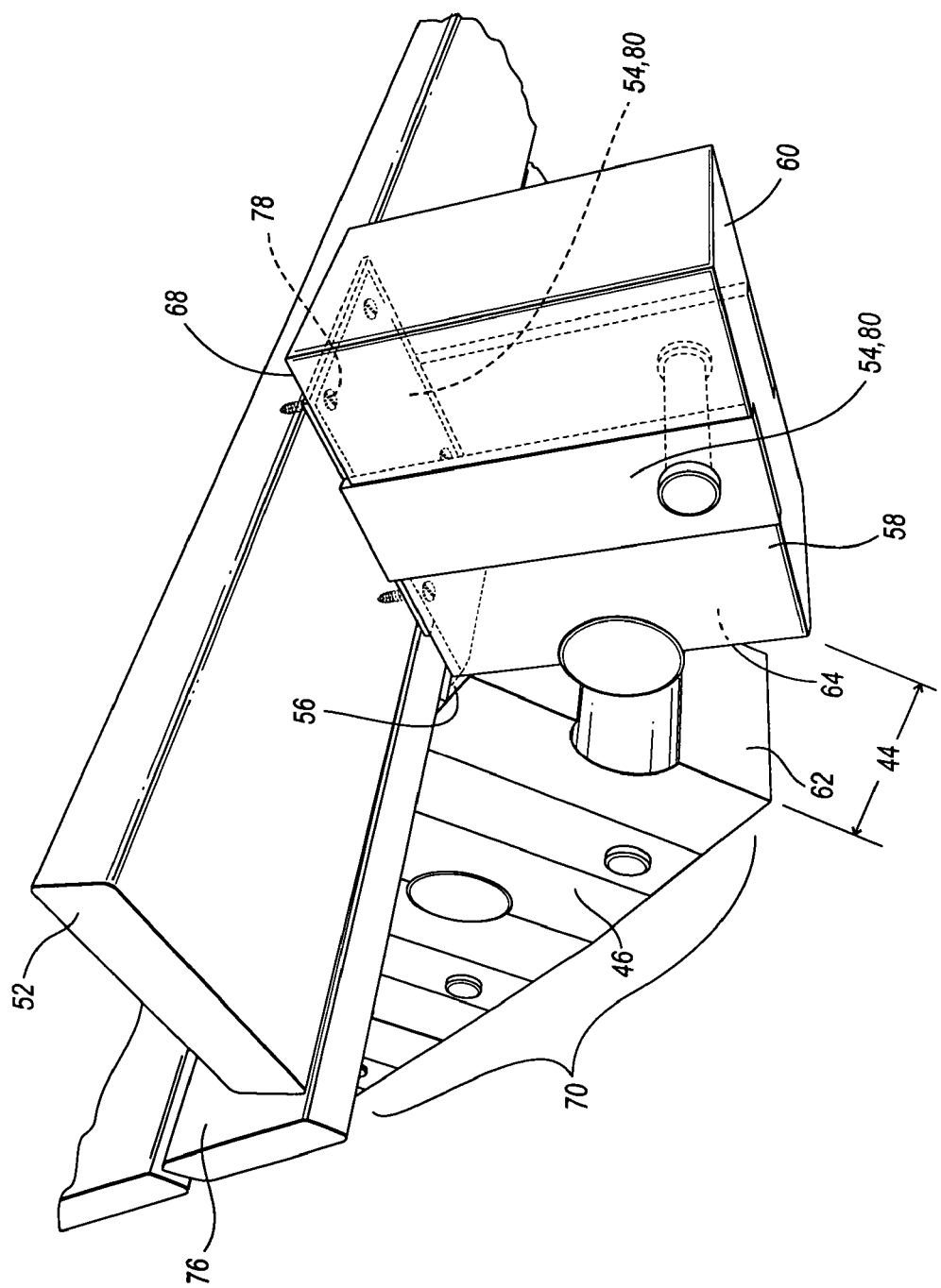
FIG. 3 illustrates a more detailed illustration of representative blocks, keys, key ways, slats and brackets.

One embodiment of the present invention is a portable chair, which can be rolled up. FIG. 2 is a visual example of a preferred embodiment of a chair contemplated by this invention. According to a preferred embodiment of the present invention, the rollable supporting device 10 is in an unrolled 38 and a seated position 34. The rollable supporting device 10 forms a non-linear shape 36 when in the unrolled 38 and a seated position 34. In the non-linear and unrolled seated position the chair comprises a stable base 32, flexible leg support 30, sturdy seating area 74 and erect back support 28. The stable base allows the chair to be placed on a variety and surfaces and allow the user to maintain a comfortable, safe and stable posture. Some surfaces envisioned by the present invention include sand, grass, concrete, carpet, wood and any other surface that might be encounter in or out of doors. The flexible leg support provides support to the legs and functionally allows the structure of the chair to absorb a weight load imposed by the user or materials placed on the chair. The sturdy seating area is not flimsy. It allows the user to sit comfortably without fear that the present invention will collapse or fold. The erect back support allows the user to recline.

Figure 1B:
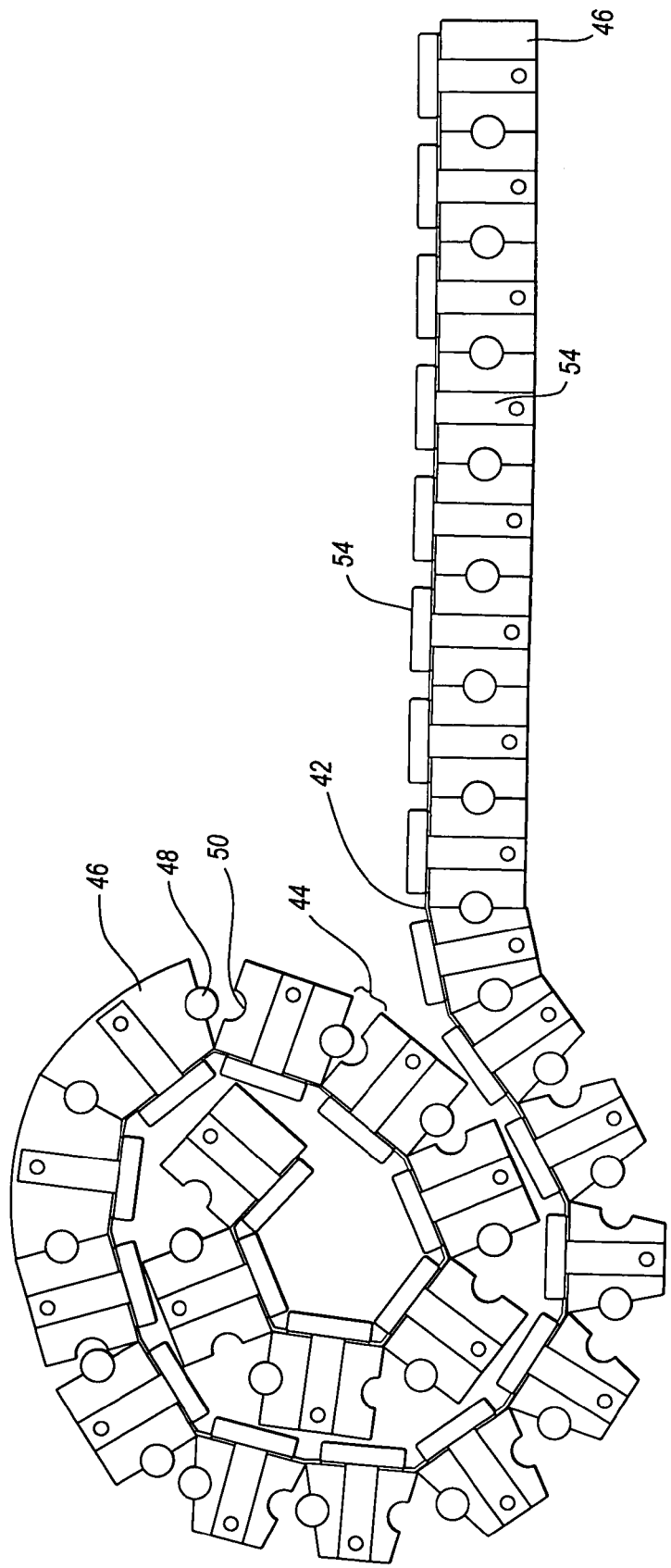

The presently described preferred embodiment of the invention can readily converted into a shape that allows for easy storage or movement. The preferred embodiment of this converted shape is assumed, as shown in FIG. 1, when the rollable supporting device 10 is in a rolled position 40. While the rolled position 40 is the preferred embodiment for storage or transport, the present invention contemplate other shapes that would be useful for storage and transport. (e.g., flat for storage under a bed).

Section Two: Other Embodiments of the Present Invention

Various shapes are contemplated by the present invention. While Section One of the Detailed Description contemplates a preferred embodiment of a chair, that description does not encompass all of the contemplated shapes the present invention may assume. The various shapes that the present invention may be designed to assume depend from unique features of the present invention. The present invention comprises a strap 42, and an angle 44, a block 46, a key 48, a key way 50, a slat 52, and a bracket 54. The blocks that comprise the rollable supporting device 10 may be shaped in a variety of ways so that when unrolled into a non-linear shape the keys and keyways mesh to form various predesigned shapes. Thus, the present invention in its unrolled shaped could form a table, a stool, a backless chair, a chair with a straight erect back support, a chair with a curved (to support the lower lumbar region of the back) erect back support, lounge chair, a chair wherein the sturdy seating area is immediately adjacent to the ground, or any one of many conceivable formations.

Various features are contemplated by the present invention. While each of the features described in Section 1 of the Detailed Description present benefits to the user, each feature alone is not an indispensable feature of the present invention. For example the present invention contemplates the production of a chair that has no erect back. An embodiment of the present invention that did not posses an erect back would resemble a stool. Such an embodiment could be created by cropping off the erect back rest or by designing the chair so that instead of being erect the back rest folded under the seating area to provide additional structural support acting as a stable base.

Another embodiment contemplated by the present invention is a chair that lacks the leg rest and stable support. Such an embodiment would place the area upon with the user sits in direct contact with the ground. Such an embodiment possesses many advantages. Particularly, such an embodiment would be lighter and thus easier to store and transport because such an embodiment would require less materials to form the chair. While being lighter and easier to transport such an embodiment would still provide the user with, when unrolled, a surface to sit on that was not the ground, which would additionally provide a backrest.

In addition to the other embodiments disclosed in the present invention it is contemplated that the present invention could be used as a table both in the rolled 40 and unrolled positions.

In another embodiment contemplated by the present invention the uprightness of the seat would be adjustable. Such an adjustment is possible through various sized wedges, rotating keys, hooking mechanisms, tethering mechanisms, sliding locks, or clips.

Figure 10A:
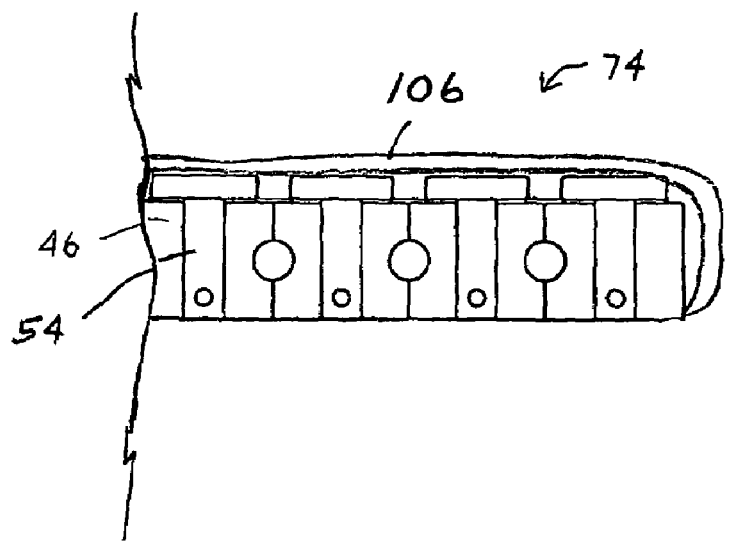
FIGS. 10A illustrates an end portion of the rollable supporting device showing a padding covering the seating surface.
Figure 10B:
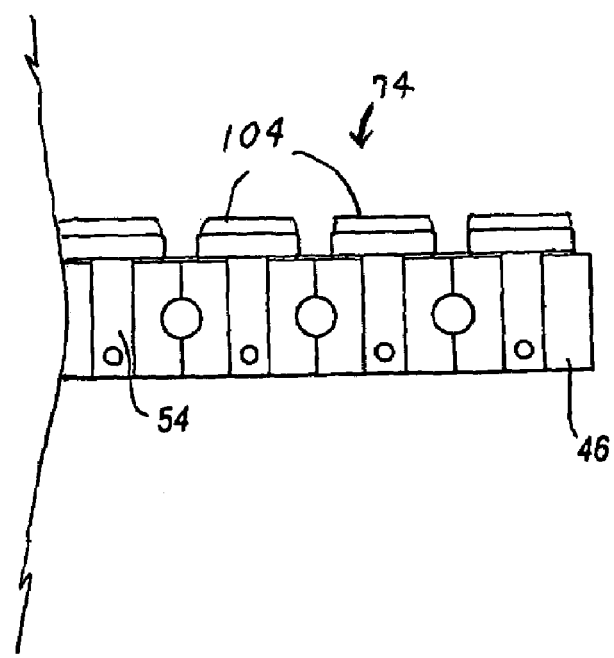
FIGS. 10B illustrates an end portion of the rollable supporting device showing a covering positioned over the seating surface.

In other embodiment contemplated by the present invention the rollable supporting device 10 could have a padding 104, see FIG. 10A, and/or a covering 106, see FIG. 10B positioned over the seating surface 74.

Additional applications and various supporter positions of the present invention are possible including benches with the unrolled 38 and the seated position 34 occurring in two different locations on opposite sides of the rollable supporting device 10. Additionally, a flat surface 82 could be placed on the top of the rolled position 40 for a table 84.

Section 3: Various Material and Methods Employed to Produce and Manufacture Some of the Embodiments of the Present Invention The forms that the present invention may be designed to assume depend from unique features of the present invention. Some of the elements utilized in the previously mentioned embodiments are comprised of a block 46, a key 48, a key way 50, a bracket 54, a strap 42, an angle 44, and a slat 52.

Figure 7:
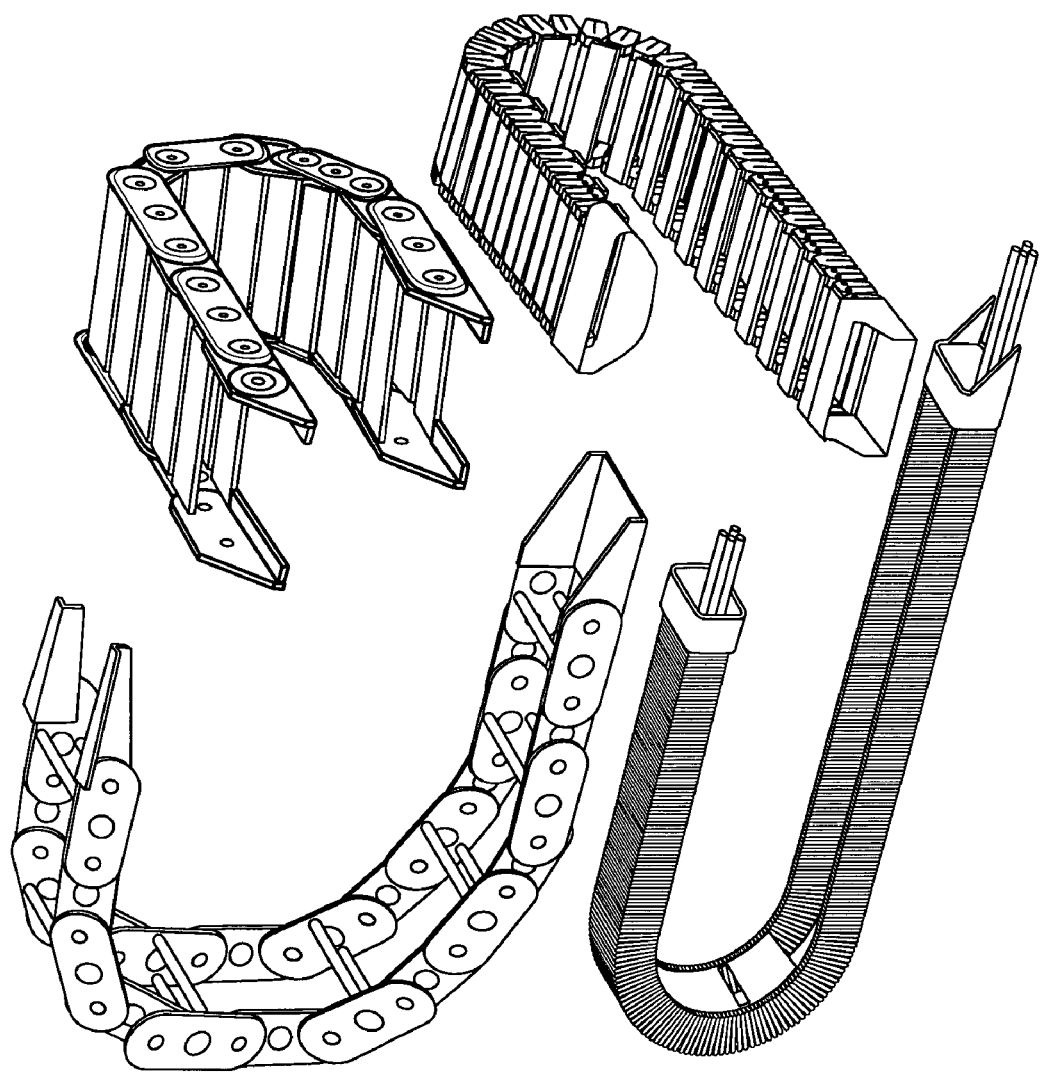
FIG. 7 illustrates other representative block configurations or material for use in accordance with embodiments of the present invention.
Figure 8:
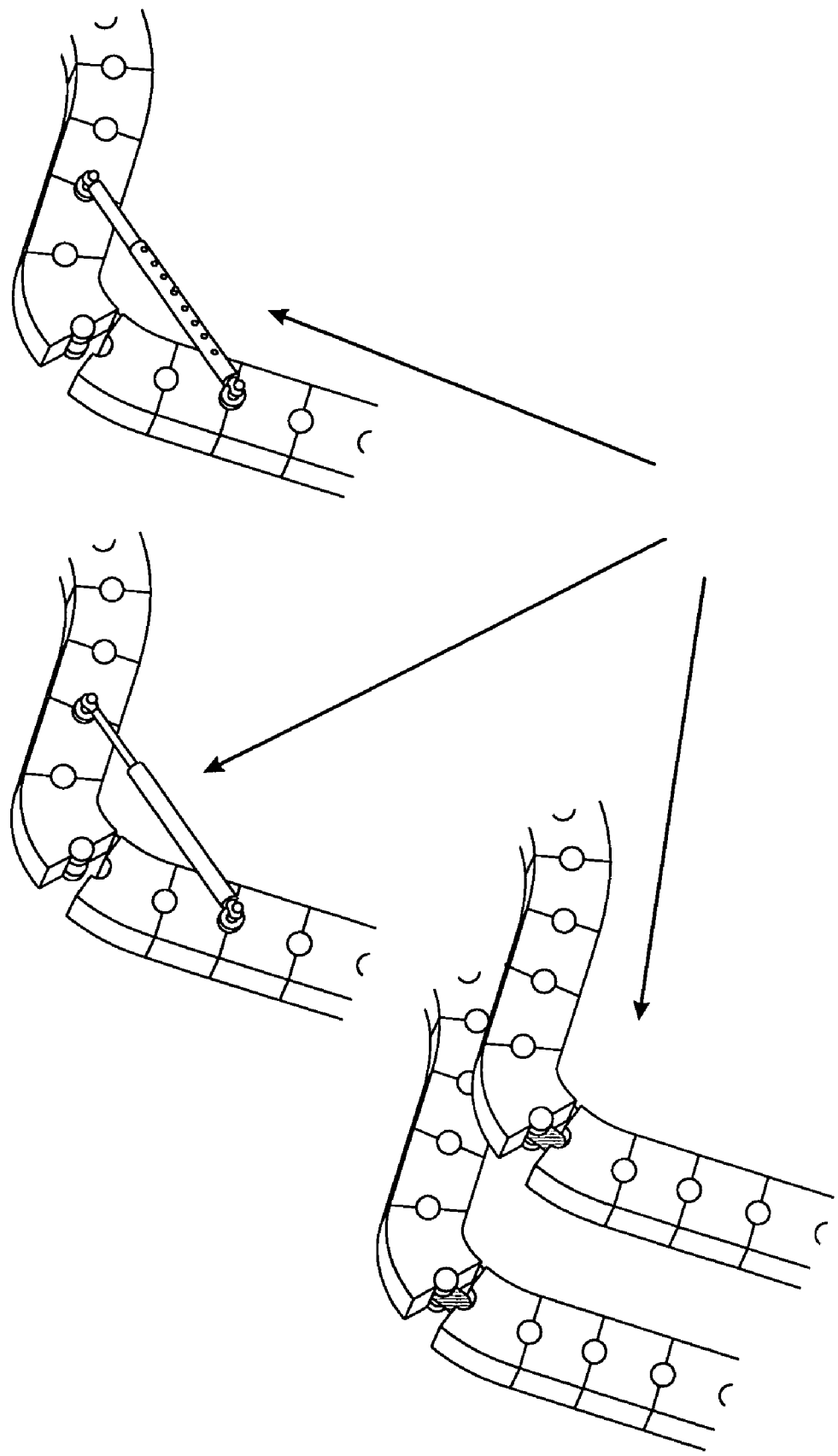
FIG. 8 illustrates representative embodiments for dynamically adjusting the positioning of at least a portion of a rollable supporting device.

The blocks 46, which can be manufactured in a variety of shapes and sizes to suit aesthetic or functional interests, consists of multiple sides. The blocks may be manufactured from any natural, synthetic or artificial substance. The blocks can be hollow or solid. As illustrated in FIG. 7 the blocks can be made of metal and resemble chain links. As illustrated by FIG. 7 the blocks may be made from hollow metal tubing. In the preferred invention, the blocks are made of a plastic or wood. The angle 44, or shape of the block is designed and manufactured so that the chair is capable of maintaining the unrolled position 38 and the seated position 34.

Similarly the strap 42 may be made from a variety of materials. In the presently preferred embodiment of the invention, the strap 42 is made of KEVLAR® brand fiber. However, the present invention contemplates the use of similar strapping material such as a metallic strap, a synthetic strap, a natural fibers strap or any combination thereof. The strap 42 is attached to the series of hingedly connected blocks 70. The strap 42 is attached to the hinged end 68 of the block 46. Blocks in a contiguous line have opposable ends, ends 62 and 64. The end of one block 62 is attached to the opposable end 64 of the next contiguous block 46. The blocks 46 are attached end 62 to opposable end 64 in a side-by-side, continuous manner creating a series of hingedly connected blocks 70.

The key 48 and the keyway 50 are comprised of, a dowel, a wedge, or cut shapes. The dowel, wedge or similar structure may be composed of material similar or dissimilar from the blocks (e.g., the blocks could be made of wood and the dowels be made of aluminum). The key and key way may be integral parts of the blocks or may be affixed to the blocks. The slat 52 consists of a variety of possible materials including, but not limited to, wood, dowels, metal plastic, composite, glass, vinyl, or a polymer. The bracket 54 consists of a variety of possible materials including, but not limited to, brackets, bolts, adhesives, or any other joinery system.

In the preferred embodiment of the key-key way system, the key 48 is attached to the end 62 of the block 46 and the additional end 64 of the block 46 comprises the key way 50. In a preferred embodiment of the bracket system, the bracket 54 is attached to the blocks 46 in a "T" shaped configuration. The bracket 54 is mounted on the side 58 of the block 46 and another side 60 of the block 46. The bracket 54 is attached to the slat 52 by means of the strap 42, or screws or adhesive material on the hinged end 68 on the block 46. The preferred means of attaching slats to the bracket is with screws. The slat 52 is attached to hinged ends 68 of the blocks 46. The slats 52 are spaced in a uniform arrangement and are selectively coupled to a positioning device 72.

Figure 4:
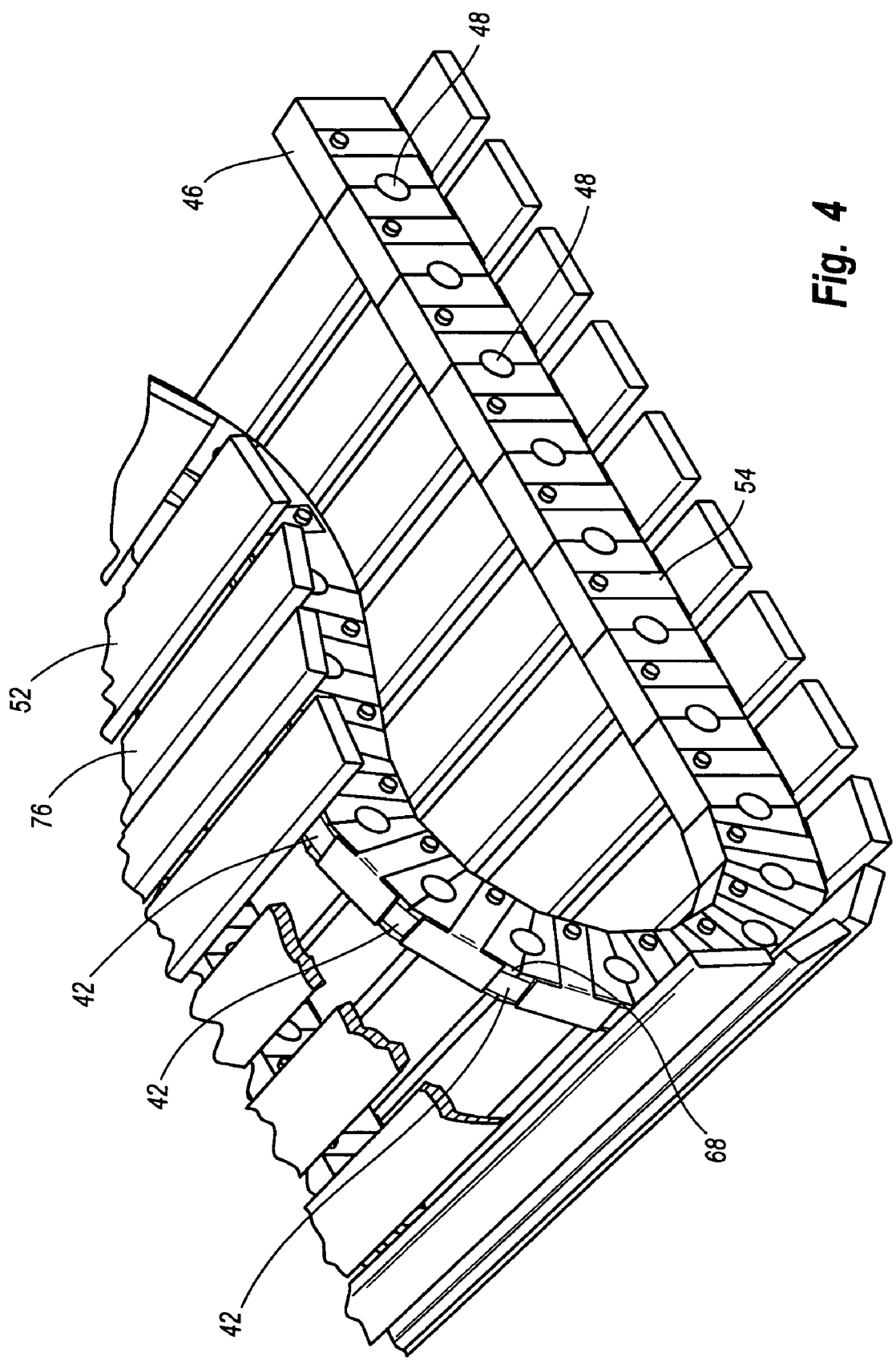
FIG. 4 illustrates a representative embodiment of a strap that acts as a hinge in transitioning between a rolled position and an unrolled position.

In a preferred embodiment of the present invention, FIG. 4, the strap 42 acts as a hinge 56, so that in the rolled position 40 or the unrolled position 38, the blocks 46 can act independently of each other but remain hingedly attached. Each block 46 therefore, is hinged. The strap 42 maintains a connection between the blocks 46 under strenuous circumstances. The strap 42 functions to hold the slats 52 in position while maintaining the position of the rollable supporting device 10. The strap 42 functions to provide strength to the rollable supporting device 10. In alternative embodiments the strap could be replaced by metal straps 108, chain links 98, tubing 96 or hinges 110.

The angles 44 are such that the blocks 46 form non-linear shapes 36 and as a result, form the series of hingedly connected blocks 70. Slats 52 are connected to the series of hingedly connected blocks 70 to provide and form a seating surface 74. The outside face 76 of the slats 52 acts as the face of the seating surface 74.

The bracket 54 serves as a mounting device 80 for the slats 52. The bracket 54 also serves as the attachment point 78 of the slats 52. The mounting device 80 could consist of a variety of materials including brackets, bolts, adhesives, or any other joinery system.

In an alternative embodiment of the present invention, FIG. 5, the key 48 and the key way 50 of the first embodiment could be replaced by a living hinge 86 embodiment. Or by hinges that resemble door hinges.

In another embodiment of the present invention, the thickness of slats 52 could vary with different materials. The slats 52 for example, could be replaced with dowels. The slats 52 could even be reduced down to the blocks 46 that act as the main support system for the chair.

In an alternative mode of the rollable supporting device 10 the strap 42 would be replaced with a high strength fabric.

Different variations of wood could be used for the blocks 46. For example, maple could be used as a substance that is less flexible, or pine could be used as a material that is more flexible. In addition, in place of the wood blocks 46 in the first embodiment, material capable of the requisite levels of friction could be used such that the bonding of the blocks 46 is accomplished without a key 48 or a key way 50.

In a different mode, the wooden blocks 46 of the first embodiment could be replaced with different materials, such as snake like linked tubes 96, chain links 98, cable 100, or hose carriers 102.

In an alternative embodiment, the blocks 46 present in the first embodiment could be replaced with a detachable hinged block 88 or a detachable hinged slat 90 that could be removed and sold separately in different shapes or as sets so that the consumer could customize the shape of the rollable supporting device 10. In addition, pre-shaped blocks 92 or pre-shaped slats 94 could be sold separately or as sets.

In an alternative embodiment, a tensioning device could be used to connect all of the blocks to one another. The tensioning device could be a cable, a rope, or other such apparatus that could be used like a cable. In this embodiment the tensioning device would act like the living hinge. In one example of this embodiment holes would be drilled through the blocks and a cable would be run through the holes in the blocks. When tension was applied to the cable the blocks would be snitched tightly together. When the tension was applied to the cable a supporting device comprising a series of connected blocks would be formed. The shape of the supporting device would be dictated by the angle of cut on the contiguous sides of the blocks that interface. Thus the blocks would have pre-designed of modifiable sides such that when two contiguous sides interface, a pre-designed shape is formed.

An additional feature contemplated by the present invention is the use of a locking device to secure the supporting structures shape. There are various forms of locking devices that could be used. One example of a locking device that would allow the supporting device to maintain its shape is the use of a strap. The strap would be used to connect the back of the top of the back rest to the bottom of the stable base. This would stabilize the shape of the chair and prevent the chair from rolling up while being utilized.

Locking clips attached to the side of the blocks opposite the strap or slats is an additional example of a locking system that would allow the supporting device to maintain its shape while being utilized. The back of each block or slat would have a locking clip attached to it. Each contiguous block would then clip to the adjacent block when the supporting device was extended. Thus each block would be locked to the next contiguous block effectively securing a portion of or the entire shape of the supporting device.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A portable free-standing supporting device comprising:
   a continuous structural spine, wherein the spine is configured to interface an object to be supported by the supporting device and is further configured to interface a resting surface upon which the portable free-standing supporting device rests, the spine consisting only of:
   a single series of hingedly-connected segments, each segment having a pre-designed shape and each pair of hingedly-connected segments having a stopping point, each segment further including a support surface, the support surface being oriented in a common position on each segment; and
   a series of hinges connecting the hingedly-connected segments and providing the hinged connection between the segments, such that when two contiguous segments bend at the hinge between the contiguous segments until the continuous segments interface at the stopping point a pre-designed geometry is created by the contiguous segments, and such that when all the pairs of contiguous segments interface at their respective stopping points a pre-designed selectively-rigid form is created, said form comprising:
   a base structure configured to rest on the resting surface, the base structure comprising a plurality of the hingedly-connected segments with the support surface of each of the hingedly-connected segments of the base structure oriented to contact the resting surface;
   a leg structure connected to and supported by the base structure; and
   a support area connected to and supported by the leg structure, with the support surface of each of the hingedly-connected segments of the support area providing support for the object, the support area terminating in a free end that does not contact the resting surface;
   wherein the pre-designed selectively-rigid form is an active position of the portable free-standing supporting device; and
   wherein the spine of the portable free-standing supporting device is capable of being rolled around itself into an inactive position for storage.

2. A portable free-standing supporting device as in claim 1, wherein the segments are wooden blocks.

3. A portable free-standing supporting device as in claim 2, wherein the stopping point of the blocks is provided by sides of the blocks adjacent the hinges.

4. A portable free-standing supporting device as in claim 3, wherein the series of hinges is a contiguous flexible strap attached to a side of each of the blocks that is not a side of each block providing the stopping point.

5. A portable free-standing supporting device as in claim 4, wherein the strap is a high-strength fabric.

6. A portable free-standing supporting device as in claim 1, wherein the series of hinges is a contiguous flexible strap attached to a side of the segments.

7. A portable free-standing supporting device as in claim 6, wherein the strap is a high-strength fabric.

8. A portable free-standing supporting device as in claim 1, wherein the pre-designed selectively-rigid form further comprises a back rest.

9. A portable free-standing supporting device as in claim 8, wherein a locking device is used to maintain the supporting device in its pre-designed selectively-rigid form.

10. A portable free-standing supporting device as in claim 9, wherein the locking device is a strap that is used to connect a top of the back rest to a bottom of the base structure.

11. A portable free-standing supporting device as in claim 1, wherein the support area includes padding or has a covering positioned over the support area.

12. A series of blocks comprising:
blocks, each said block comprising:
sides;
a key on a first said side of said block;
a key way on a second said side of said block opposite the first said side of said block; and
a bracket attached to the block on a said side of said block that is not the first said side or the second said side; and
a flexible strap fixedly attached to a said side of each of said blocks that is not the first said side or the second said side, said flexible strap being configured to serve as a hinge between consecutive said blocks in the series;
wherein the series of blocks is configured so that flexing the hinges for each of the series of blocks to a maximal extent in one direction a) brings the key of each block into connection with the keyway of each adjacent block and b) forms the series of blocks into a supporting position that is a pre-designed shape comprising:
a stable base configured to rest upon the ground and support the series of blocks; and
a support surface; and
wherein the series of blocks is further configured so that flexing the hinges for each of the series of blocks in an opposite direction allows the series of blocks to roll into a portable rolled position wherein the series of blocks is rolled around itself.

13. A series of blocks as recited in claim 12, wherein said blocks are positioned such that when two contiguous sides interface a non-linear shape is formed.

14. A series of blocks, as recited in claim 12, wherein slats attach to the blocks to form a surface, wherein said slats are spaced in a uniform arrangement and said slats are selectively coupled to a positioning device.

15. A series of blocks, as recited in claim 12, wherein said strap acts as a hinge to allow the blocks to act independently of each other while remaining hingedly attached.

16. A series of blocks, as recited in claim 15, wherein said strap is a high-strength fabric.

17. A series of blocks, as recited in claim 12, wherein the bracket is positioned around a hinged end of the block and is capable of serving as an attachment point of a slat.

18. A portable free-standing supporting device comprising:
a continuous structural spine, wherein the spine is configured to interface an object to be supported by the supporting device and is further configured to interface a resting surface upon which the portable free-standing supporting device rests, the spine comprising:
at least two spaced apart series of hingedly-connected segments, each segment having a pre-designed shape and adjacent hingedly-connected segments in each series having a stopping point, the hingedly-connected segments in one of the series linked with a respective hingedly-connected segments in the other of the series using a slat to form a hingedly connected segment assembly having a support surface; and
a series of hinges connecting the hingedly-connected segments in each series and providing the hinged connection between contiguous segments, such that when two contiguous segments bend at the hinge between the contiguous segments until the contiguous segments interface at the stopping point a pre-designed geometry is created by the contiguous segments, and such that when all the adjacent contiguous segment assemblies interface a pre-designed selectively-rigid form is created, said form comprising:
a base structure configured to rest on the resting surface, the base structure comprising a plurality of the hingedly-connected segments with the support surface of the hingedly-connected segment assembly of the base structure oriented to contact the resting surface;
a leg structure connected to and supported by the base structure; and
a support area connected to and supported by the leg structure, the support area comprising a plurality of the hingedly-connected segments with the support surface of the hingedly-connected segment assembly of the support area providing support for the object, the support area terminating in a free end that does not contact the resting surface;
wherein the pre-designed selectively-rigid form is an active position of the portable free-standing supporting device; and
wherein the spine of the portable free-standing supporting device is capable of being rolled around itself into an inactive position for storage.

19. A portable free-standing supporting device as in claim 18, wherein the segments are wooden blocks.

20. A portable free-standing supporting device as in claim 19, wherein the stopping point of the blocks is provided by sides of the blocks adjacent the hinges.

21. A portable free-standing supporting device as in claim 20, wherein the series of hinges is a contiguous flexible strap attached to a side of each of the blocks that is not a side of each block providing the stopping point.

22. A portable free-standing supporting device as in claim 21, wherein the strap is a high-strength fabric.

23. A portable free-standing supporting device as in claim 21, wherein said slats are manufactured from a material selected from the group of wood, metal, plastic, composite, glass, vinyl, and polymer.

24. A portable free-standing supporting device as in claim 18, wherein the series of hinges is a contiguous flexible strap attached to a side of the segments.

25. A portable free-standing supporting device as in claim 24, wherein the strap is a high-strength fabric.

26. A portable free-standing supporting device as in claim 18, wherein the pre-designed selectively-rigid form further comprises a back rest.

27. A portable free-standing supporting device as in claim 26, wherein a locking device is used to maintain the supporting device in its pre-designed selectively-rigid form.

28. A portable free-standing supporting device as in claim 27, wherein the locking device is a strap that is used to connect a top of the back rest to a bottom of the base structure.

29. A portable free-standing supporting device as in claim 18, wherein the support area includes padding or has a covering positioned over the support area.

* * * * *